US008653784B2

(12) United States Patent
Bland (10) Patent No.: US 8,653,784 B2
(45) Date of Patent: Feb. 18, 2014

(54) SYSTEM AND METHOD FOR RELAYING ENERGY FROM A SPACE TRANSMITTER TO AN ELECTRONIC DEVICE VIA AN EARTH STATION

(76) Inventor: Todd Allen Bland, Omaha, NE (US)

( * ) Notice: Subject to any disclaimer, the term of this patent is extended or adjusted under 35 U.S.C. 154(b) by 17 days.

(21) Appl. No.: 12/965,837

(22) Filed: Dec. 11, 2010

(65) Prior Publication Data

US 2011/0080135 A1   Apr. 7, 2011

Related U.S. Application Data

(63) Continuation-in-part of application No. 12/284,731, filed on Sep. 25, 2008, now abandoned.

(60) Provisional application No. 61/062,926, filed on Jan. 31, 2008.

(51) Int. Cl.
  *H02J 7/00* (2006.01)

(52) U.S. Cl.
  USPC ............. 320/101; 320/DIG. 33; 244/172.7; 322/2 R (58) Field of Classification Search
  USPC .......... 320/101, DIG. 33; 244/172.7; 322/2 R
  See application file for complete search history.

(56) References Cited

U.S. PATENT DOCUMENTS

| | | | | | |
|---|---|---|---|---|---|
| 3,781,647 | A | * | 12/1973 | Glaser | 322/2 R |
| 3,933,323 | A | * | 1/1976 | Dudley et al. | 244/1 R |
| 3,989,994 | A | * | 11/1976 | Brown | 322/2 R |
| 4,003,756 | A | * | 1/1977 | Abrams | 136/246 |
| 4,069,812 | A | * | 1/1978 | O'Neill | 136/246 |
| 6,075,200 | A | * | 6/2000 | O'Neill | 136/246 |
| 6,492,940 | B2 | * | 12/2002 | Mikami et al. | 342/354 |
| 6,967,462 | B1 | * | 11/2005 | Landis | 320/101 |
| 7,900,875 | B2 | * | 3/2011 | Criswell | 244/172.7 |
| 8,074,936 | B2 | * | 12/2011 | Criswell | 244/172.7 |
| 8,446,248 | B2 | * | 5/2013 | Zeine | 340/5.1 |
| 2001/0035207 | A1 | * | 11/2001 | Mikami et al. | 136/292 |
| 2003/0098058 | A1 | * | 5/2003 | Takada et al. | 136/244 |
| 2006/0113955 | A1 | * | 6/2006 | Nunally | 320/108 |
| 2006/0238365 | A1 | * | 10/2006 | Vecchione et al. | 340/657 |
| 2010/0079010 | A1 | * | 4/2010 | Hyde et al. | 307/149 |
| 2010/0289342 | A1 | * | 11/2010 | Maness | 307/104 |
| 2010/0315045 | A1 | * | 12/2010 | Zeine | 320/137 |
| 2012/0326660 | A1 | * | 12/2012 | Lu et al. | 320/108 |
| 2013/0032673 | A1 | * | 2/2013 | Kobayashi | 244/158.4 |

FOREIGN PATENT DOCUMENTS

JP            11055878 A    *   2/1999

* cited by examiner

*Primary Examiner* — Yalkew Fantu
*Assistant Examiner* — Manuel Hernandez
(74) *Attorney, Agent, or Firm* — Suiter Swantz pc llo (57) ABSTRACT

A method and system for solar powered charging of an electronic device is provided. Solar concentrators direct solar energy onto photovoltaic cells on an orbiting space station or a satellite in a geostationary orbit. The photovoltaic cells convert the solar energy to direct current (DC) electrical power. Energy generators convert the DC electrical power to generate energy waves, for example, microwaves. A space transmitter relays the energy waves to one or more earth stations. The electronic device transmits a locator beam indicating its current location. On receiving the locator beam, an earth station transmits the energy waves to the electronic device. A rectenna, in electronic communication with the electronic device, converts the energy waves to DC electrical power and directs the DC electrical power to a charger in electric communication with the electronic device. The charger receives the energy waves or the DC electrical power and charges the electronic device.

21 Claims, 9 Drawing Sheets

SYSTEM AND METHOD FOR RELAYING ENERGY FROM A SPACE TRANSMITTER TO AN ELECTRONIC DEVICE VIA AN EARTH STATION

CROSS REFERENCE TO RELATED APPLICATIONS

This application is a continuation-in-part application of non-provisional patent application Ser. No. 12/284,731 titled "Cellular Phone And Portable Electronic Device Sun Powered Process", filed on Sep. 25, 2008 now abandoned in the United States Patent and Trademark Office, which claims priority from provisional patent application No. 61/062,926, filed on Jan. 31, 2008 in the United States Patent and Trademark Office.

The specification of the above referenced patent application is incorporated herein by reference in its entirety.

BACKGROUND

Over time, electronic devices have become more compact and hence more portable. This portability has necessitated a portable source of power to power up and operate portable electronic devices. Conventional methods of powering a portable electronic device employ external charging devices, for example, adapters for charging small, on-board batteries of the portable electronic device, which are not convenient for charging the electronic device on the fly, or where the electronic device runs out of power and an electrical power outlet is not readily available in the vicinity of the electronic device.

Moreover, the present over-dependence on generating electrical power from non-renewable sources such as coal, petroleum, and natural gas, has made these sources vulnerable to their non-availability, thereby resulting in power outages, "black-outs", etc. Furthermore, generation of electrical power through these non-renewable sources puts a huge toll on the environment. Therefore, there is a need for a source for generating electrical power that is abundant, not harmful to the environment, and easily accessible by a wireless means for charging a portable electronic device.

Hence, there is a long felt but unresolved need for a method and system that enables solar powered charging of an electronic device.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the above stated need for solar powered charging of an electronic device. Multiple photovoltaic cells are provided on an orbiting space station, or a satellite in a geostationary orbit. The photovoltaic cells convert solar energy incident on the photovoltaic cells to direct current (DC) electrical power. In an embodiment, multiple solar concentrators, for example, flexible Fresnel lenses, are provided on the photovoltaic cells for concentrating the solar energy on the photovoltaic cells.

The DC electrical power is directed to multiple energy generators residing on the orbiting space station, or the satellite in the geostationary orbit. In an embodiment, the DC electrical power is also directed to multiple energy storage devices residing on the orbiting space station, or the satellite in the geostationary orbit. The energy generators convert the DC electrical power to generate energy waves, for example, microwaves, radio waves, etc. In an embodiment, the generated energy waves are directed to an amplifier residing on the orbiting space station, or the satellite in the geostationary orbit. The amplifier amplifies the generated energy waves to high power energy waves for enabling transmission of the energy waves over large distances.

The high power energy waves are directed to a space transmitter residing on the orbiting space station, or the satellite in the geostationary orbit. The space transmitter comprises a phased array antenna for forming and transmitting a beam of high power energy waves to one or more earth stations. The earth stations are positioned at predetermined locations on the earth's surface. In an embodiment, the method and system disclosed herein enables a user of the electronic device to select one of the earth stations for receiving the energy waves for charging the electronic device. The space transmitter relays the beam of high power energy waves to the selected earth station. The earth station transmits the relayed energy waves on demand to an electronic device, for example, a cell phone, a laptop computer, a tablet computer, a personal digital assistant (PDA), a music player, a calculator, a pager, etc., for charging the electronic device.

The electronic device that is required to be charged transmits a locator beam to the earth station. The locator beam identifies and indicates the location of the electronic device to the earth station. The earth station receives the locator beam and determines the location of the electronic device with respect to the earth station from the locator beam. The earth station thereafter transmits a pilot beam to the space transmitter on reception of the locator beam from the electronic device. The pilot beam signals the space transmitter to initiate relaying of the energy waves from the space transmitter to the earth station. In an embodiment, the earth stations attenuate the beam of high power energy waves to low power energy waves suitable for transmission on earth to the electronic device.

In an embodiment, the energy generators residing on the orbiting space station or the satellite in the geostationary orbit generate low power energy waves. The space transmitter relays the low power energy waves to the earth station. The earth station then transmits the low power energy waves to the electronic device. The method and system disclosed herein further provides a device charging electronic assembly in communication with one or more earth stations. The device charging electronic assembly comprises the electronic device and a charger. The charger, in electric communication with the electronic device, receives the low power energy waves from the earth station and charges the electronic device with the received low power energy waves. In an embodiment, the device charging electronic assembly further comprises a rectenna in electronic communication with the electronic device. The earth station transmits the relayed energy waves to the rectenna. The rectenna receives the relayed energy waves and converts the received energy waves to direct current (DC) electrical power. The rectenna feeds the DC electrical power to the charger in electric communication with the electronic device. The charger charges the electronic device with the DC electrical power. In an embodiment, the electronic device is configured to directly receive low power energy waves from the earth station for charging the electronic device. In another embodiment, the rectenna and/or the charger reside within the electronic device. In another embodiment, the rectenna and/ or the charger reside external to the electronic device.

The system disclosed herein further comprises a locator beam generator and a stop beam generator in the electronic device for generating the locator beam and a stop beam respectively. The locator beam identifies and indicates the location of the electronic device to the earth station. The stop beam, when transmitted by the electronic device to the earth station, terminates the transmission of the energy waves from the earth station to the electronic device. The electronic device transmits the stop beam, for example, on completion of charging of the electronic device.

The method and system disclosed herein also enables charging of a moving electronic device. In an embodiment, the electronic device provides location updates to the earth station based on change in the location of the electronic device when the electronic device is in motion. The electronic device provides the location updates by transmitting locator beams to the earth station for indicating the current location of the moving electronic device.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific components and methods disclosed herein.

DETAILED DESCRIPTION OF THE INVENTION

Figure 1A:
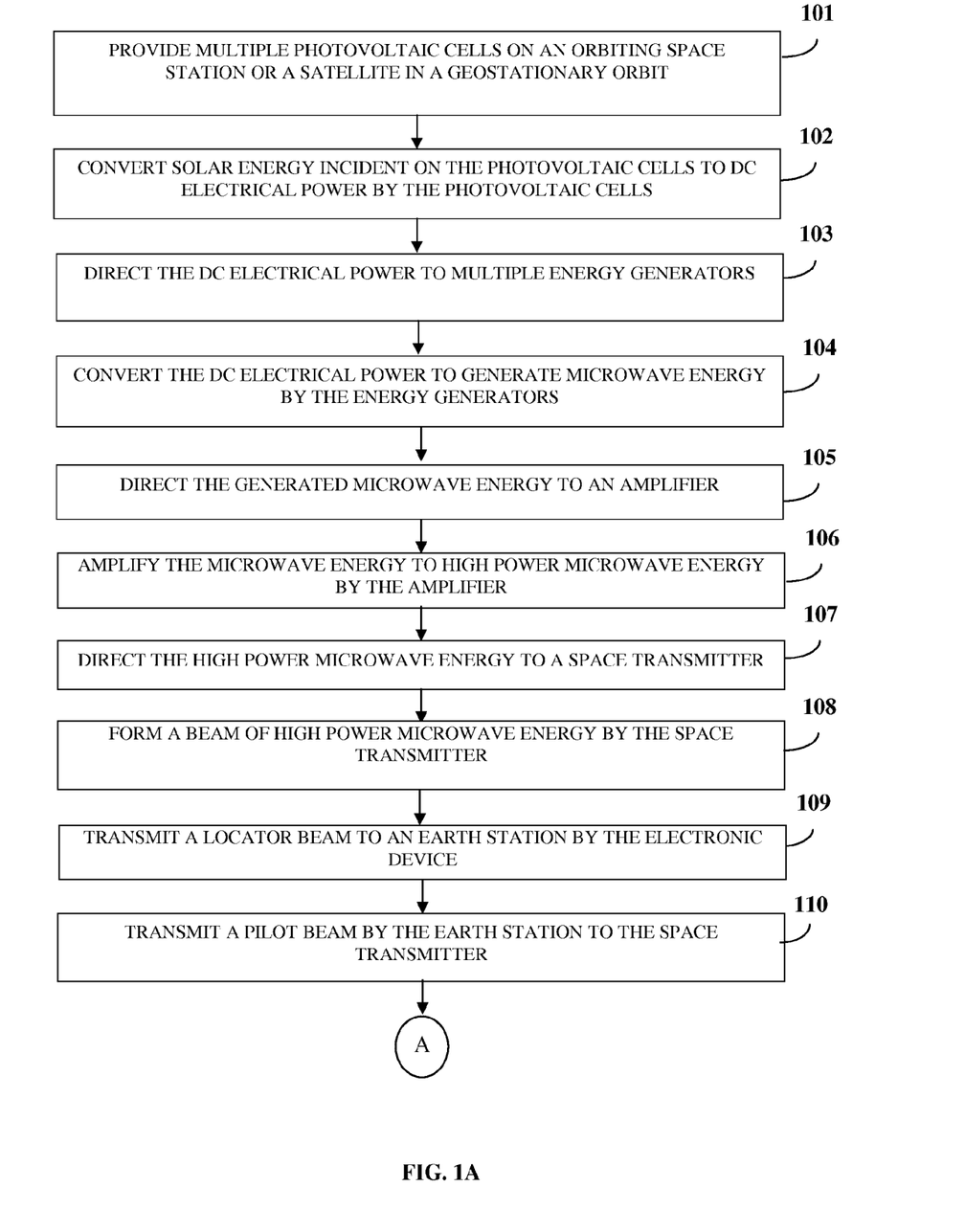
FIGS. 1A-1B exemplarily illustrate a method for solar powered charging of an electronic device.
Figure 1B:
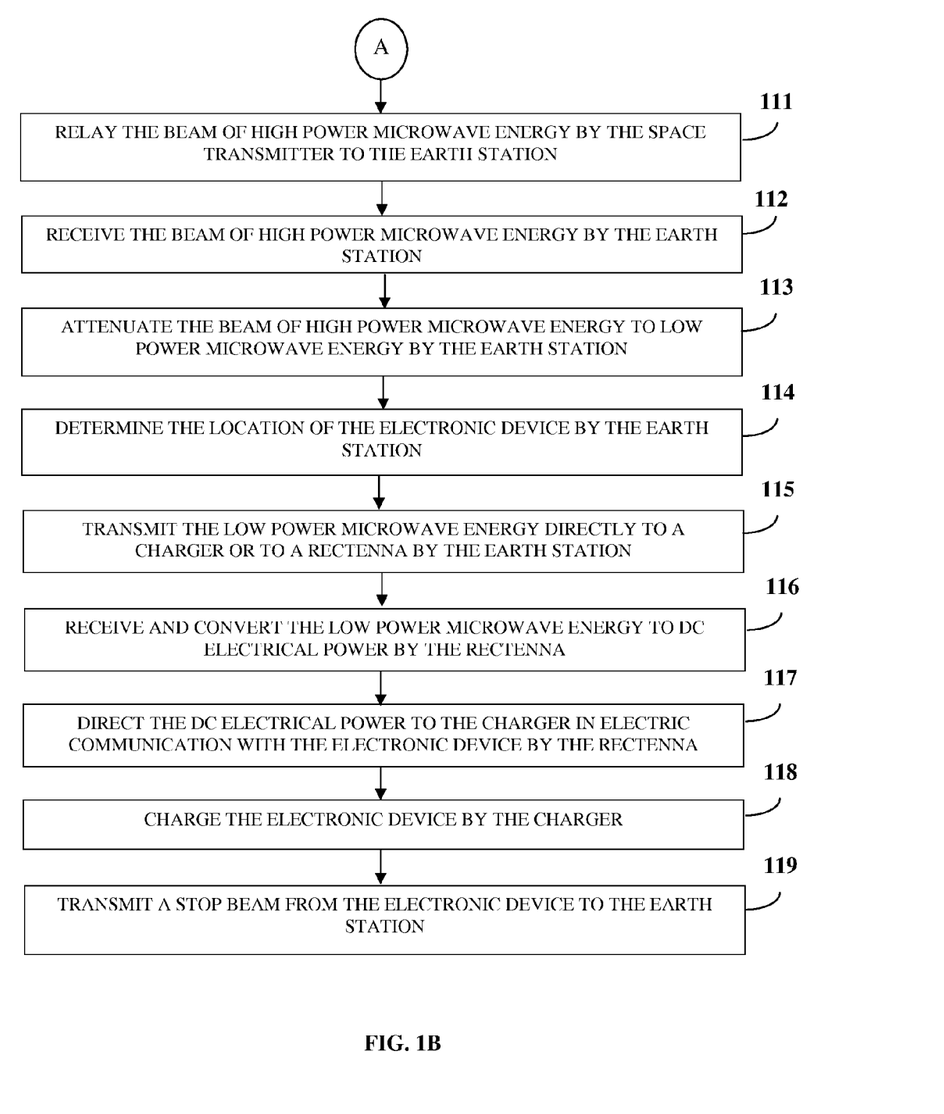

FIGS. 1A-1B exemplarily illustrate a method for solar powered charging of an electronic device. As used herein, the term "electronic device" refers to any chargeable device, for example, a cell phone, a laptop computer, a tablet computer, a personal digital assistant (PDA), a music player, a calculator, a pager, etc. The method disclosed herein provides 101 multiple photovoltaic cells on an orbiting space station, or a satellite in a geostationary orbit. The photovoltaic cells use semiconductor cells, for example, silicon, gallium arsenide, etc., to convert 102 solar energy incident on the photovoltaic cells to direct current (DC) electrical power, which is well known in the art. The geostationary orbit is a geosynchronous orbit directly above the earth's equator, with a period equal to the earth's rotational period and an orbit eccentricity of approximately zero.

In an embodiment, multiple solar concentrators are provided on the photovoltaic cells for concentrating the solar energy on the photovoltaic cells. The solar concentrators are, for example, flexible or stretched Fresnel lenses disposed on each of the photovoltaic cells. The flexible Fresnel lenses use ultra-thin refractive optical elements to collect and focus solar energy onto the photovoltaic cells. The flexible Fresnel lenses focus and direct a large area of incident solar energy towards a particular spot on a photovoltaic cell by bending the rays of light and focusing them on the photovoltaic cell. The flexible Fresnel lenses are disposed on each of the photovoltaic cells for intensifying the solar energy incident on the photovoltaic cells. Using a relatively inexpensive flexible Fresnel lens over each photovoltaic cell, to collect and focus solar energy spread across a large area onto a much smaller photovoltaic cell, allows for the reduction in the number of expensive photovoltaic cells required. The reduction in the number of photovoltaic cells required to produce direct current (DC) electrical power results in reduction of the overall cost of generating electrical power. In an embodiment, the DC electrical power generated by the photovoltaic cells is stored on the orbiting space station, or the satellite in the geostationary orbit.

The DC electrical power is directed 103 to multiple energy generators residing on the orbiting space station, or the satellite in the geostationary orbit. In an embodiment, the DC electrical power is directed to multiple energy storage devices residing on the orbiting space station, or the satellite in the geostationary orbit. In order to relay the DC electrical power to one or more earth stations, multiple energy generators convert 104 the DC electrical power to generate low power or high power energy waves, for example, microwaves, radio waves, laser beams, etc. For purposes of illustration, the detailed description refers to generation and transmission of low power or high power microwaves. However, the scope of the method and system disclosed herein is not limited to generation and transmission of microwaves but may be extended to include other electromagnetic waves, for example, radio waves, laser beams, etc. Microwave energy generators are used for generating low power or high power microwaves, while radio wave energy generators are used for generating low power or high power radio waves. For generation of microwaves, the energy generators are high-powered vacuum tubes that generate microwave energy using the interaction of a stream of electrons with a magnetic field, which is well known in the art. In an embodiment, the generated microwave energy is directed 105 to an amplifier residing on the orbiting space station, or the satellite in the geostationary orbit. The amplifier amplifies 106 the generated microwave energy to high power microwave energy for enabling transmission of the microwave energy over large distances. As used herein, the term "high power microwave energy" refers to energy having a power density, for example, in the range of about 1 kW/cm$^2$ to about 1 MW/cm$^2$. The amplifier is, for example, a solid state amplifier. Solid state amplifiers amplify microwave energy having a power of, for example, about 100 watts to a high power microwave energy having a power of, for example, about 100 megawatts (MW).

The high power microwave energy is directed 107 to a space transmitter residing on the orbiting space station, or the satellite in the geostationary orbit. The space transmitter relays the high power microwave energy to one or more earth stations positioned at predetermined locations on the earth's surface. As used herein, the term "earth stations" refer to stations on the earth's surface that receive energy waves from a space transmitter or antenna and thereafter transmit the energy waves to the electronic device for charging the electronic device. One or more earth stations are positioned at predetermined geographical locations on the earth's surface, such that the earth stations cover an area that provides energy transmission and charging capability to the electronic devices that need to be charged. The number of earth stations required depends on the area over which the energy transmission and charging service is to be provided. An earth station covers a range of, for example, about 50 miles. Each of the earth stations comprises a transceiver, an attenuator, and a decoder as disclosed in the detailed description of FIG. 2. In an embodiment, the space transmitter comprises a phased array antenna for forming 108 and transmitting a beam of high power microwave energy to one or more earth stations. A phased array antenna is an antenna that accurately controls and directs the beam of high power microwave energy, for example, towards the earth station.

Figure 4:
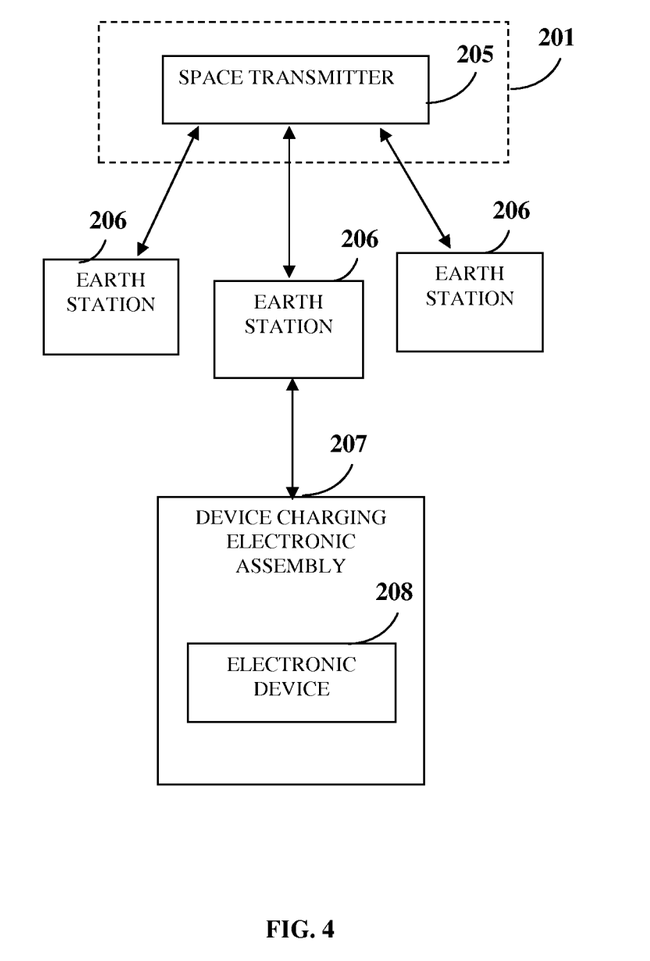
FIG. 4 exemplarily illustrates an embodiment of the system for solar powered charging of an electronic device, where the electronic device selects one of the earth stations for receiving energy waves for charging the electronic device.

In an embodiment, the electronic device selects one of the earth stations based on the electronic device's location for receiving microwave energy from the selected earth station for charging the electronic device as disclosed in the detailed description of FIG. 4. The electronic device transmits 109 a locator beam to the selected earth station when the electronic device requires microwave energy for charging as disclosed in the detailed description of FIG. 2. As used herein, the term "locator beam" is, for example, a radio frequency (RF) signal, a microwave signal, etc., modulated with the current location information of the electronic device. The current location information of the electronic device is obtained, for example, using a global positioning system (GPS) receiver installed in the electronic device. The earth station receives the locator beam from the electronic device. Reception of the locator beam by the earth station from the electronic device signals to the earth station that the electronic device requires microwave energy for charging. The locator beam initiates transmission of the microwave energy from the earth station to the electronic device for charging the electronic device. The locator beam also provides the current location of the electronic device with reference to the earth station, to the earth station.

On reception of the locator beam from the electronic device, the earth station transmits 110 a pilot beam to the space transmitter. As used herein, the term "pilot beam" refers to, for example, a radio frequency (RF) signal, a microwave signal, etc., that signals the space transmitter to initiate relaying of the microwave energy from the space transmitter to the earth station. On reception of the pilot beam by the space transmitter, the space transmitter relays 111 a beam of high power microwave energy to the earth station. The beam of high power microwave energy can be transmitted at multiple frequencies customizable as per the design of the space transmitter. In an example, the space transmitter relays the high power microwave energy with a frequency of about 2.45 gigahertz (GHz) to the earth station.

The earth station receives 112 the beam of high power microwave energy from the space transmitter. On the earth's surface, safe exposure limits for microwave energy power density is about 10 mW/cm$^2$. The earth station attenuates 113 the high power microwave energy to low power microwave energy prior to transmission of microwave energy on the earth's surface to the electronic device. As used herein, the term "low power microwave energy" refers to microwave energy having a power density, for example, in the range of about 1 mW/cm$^2$ to about 10 mW/cm$^2$. In an example, a 1 kW/cm$^2$ beam of high power microwave energy received from the space transmitter is attenuated to low power microwave energy having a power density of 10 mW/cm$^2$, which is accepted as a safe level for transmission of microwave energy.

On receiving the locator beam from the electronic device and on determining 114 the location of the electronic device from the locator beam, the earth station transmits 115 the low power microwave energy to the electronic device. A charger, in electric communication, with the electronic device receives the low power microwave energy from the earth station and charges the electronic device with the received low power microwave energy. In an embodiment, the earth station transmits the low power microwave energy to a rectenna in electronic communication with the electronic device. The rectenna is, for example, a radio frequency rectenna, an optical rectenna, etc. The rectenna receives 116 the low power microwave energy transmitted by the earth station. The rectenna converts 116 the received low power microwave energy to DC electrical power. The rectenna is a rectifying antenna that directly converts microwave energy into DC electrical power. The rectenna is constructed from, for example, a Schottky diode placed between antenna dipoles. The Schottky diode rectifies the current induced in the antenna dipoles by the microwave energy. Schottky diodes are used as they have the lowest voltage drop and highest speed and therefore waste the least amount of power due to conduction and switching. The working of the rectenna is disclosed in the detailed description of FIG. 6. The rectenna directs 117 the DC electrical power to the charger in electric communication with the electronic device for charging the electronic device with the DC electrical power. The charger is a device that charges a battery of the electronic device by transmitting energy into the battery through a force of electric current through the battery. The charger charges 118 the electronic device with the DC electrical power. The charger uses the DC electrical power as a source of charging the battery of the electronic device and/or as operating power for the electronic device.

In an embodiment, the method disclosed herein is used for charging a moving electronic device. The electronic device provides location updates to the earth station based on change in location of the moving electronic device. The moving electronic device provides the location updates, for example, by transmitting locator beams to the earth station for indicating current location of the moving electronic device. The rectenna, which is in electronic communication with the electronic device, receives the transmitted low power microwave energy from the earth station only within the area of reception of the rectenna. In an example, the area of reception of a rectenna is about 6 meters radius from a point of the rectenna. In an example, a rectenna realizes an efficiency of 52% for an input power of 0 decibels milliwatts (dBm) at 2.45 GHz. When the electronic device moves out of the area of reception of the rectenna, the rectenna does not receive the transmitted low power microwave energy. On non-reception of the transmitted microwave energy, the electronic device provides location updates to the earth station. The location updates are provided by transmitting a locator beam from the electronic device to the earth station, each time the electronic device moves out of the area of reception of the rectenna. The locator beam indicates the new location of the electronic device to the earth station. On reception of the locator beam by the earth station, the earth station determines the new location of the electronic device and transmits the low power microwave energy in the direction of the new location of the electronic device.

On completion of charging, in order to terminate transmission of the low power microwave energy, the electronic device is actuated to transmit 119 a stop beam to the earth station. The earth station, on reception of the stop beam, terminates the transmission of the low power microwave energy to the electronic device.

Figure 5:
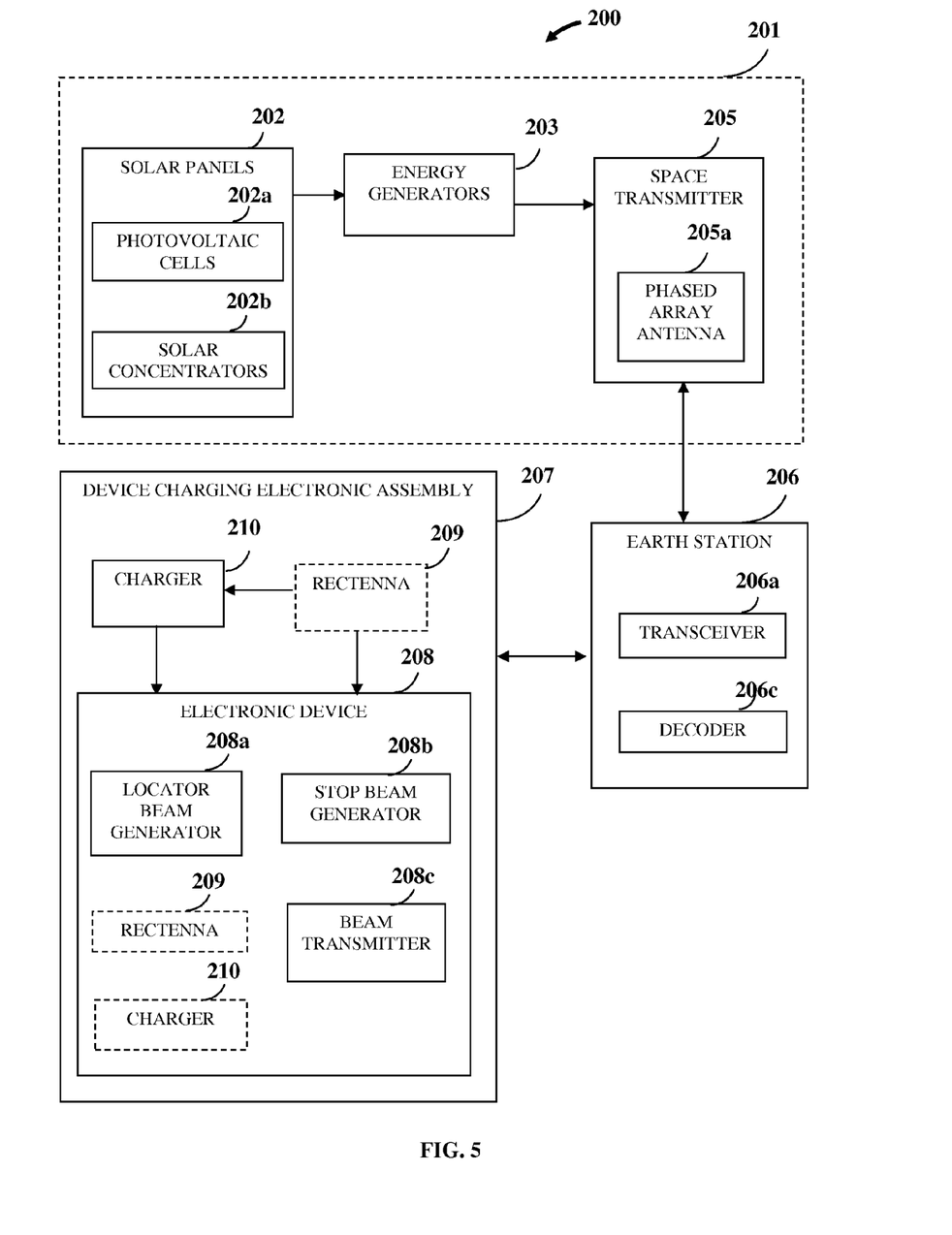
FIG. 5 exemplarily illustrates an embodiment of the system for solar powered charging of an electronic device, where a space transmitter transmits low power energy waves to the earth station for charging the electronic device.

In an embodiment, the energy generators generate low power energy waves, for example, low power microwave energy, which is directed to the space transmitter for relaying to the earth stations as disclosed in the detailed description of FIG. 5. One of the earth stations transmits the low power microwave energy to the charger for charging the electronic device. In an embodiment, the earth station transmits the low power microwave energy to the rectenna in electronic communication with the electronic device, where the rectenna converts the low power microwave energy to DC electrical power used for charging the electronic device by the charger. In an embodiment, the electronic device can be powered directly using the low power microwave energy received directly from the space transmitter on the orbiting space station, or the satellite in the geostationary orbit or directly from the earth station.

Figure 2:
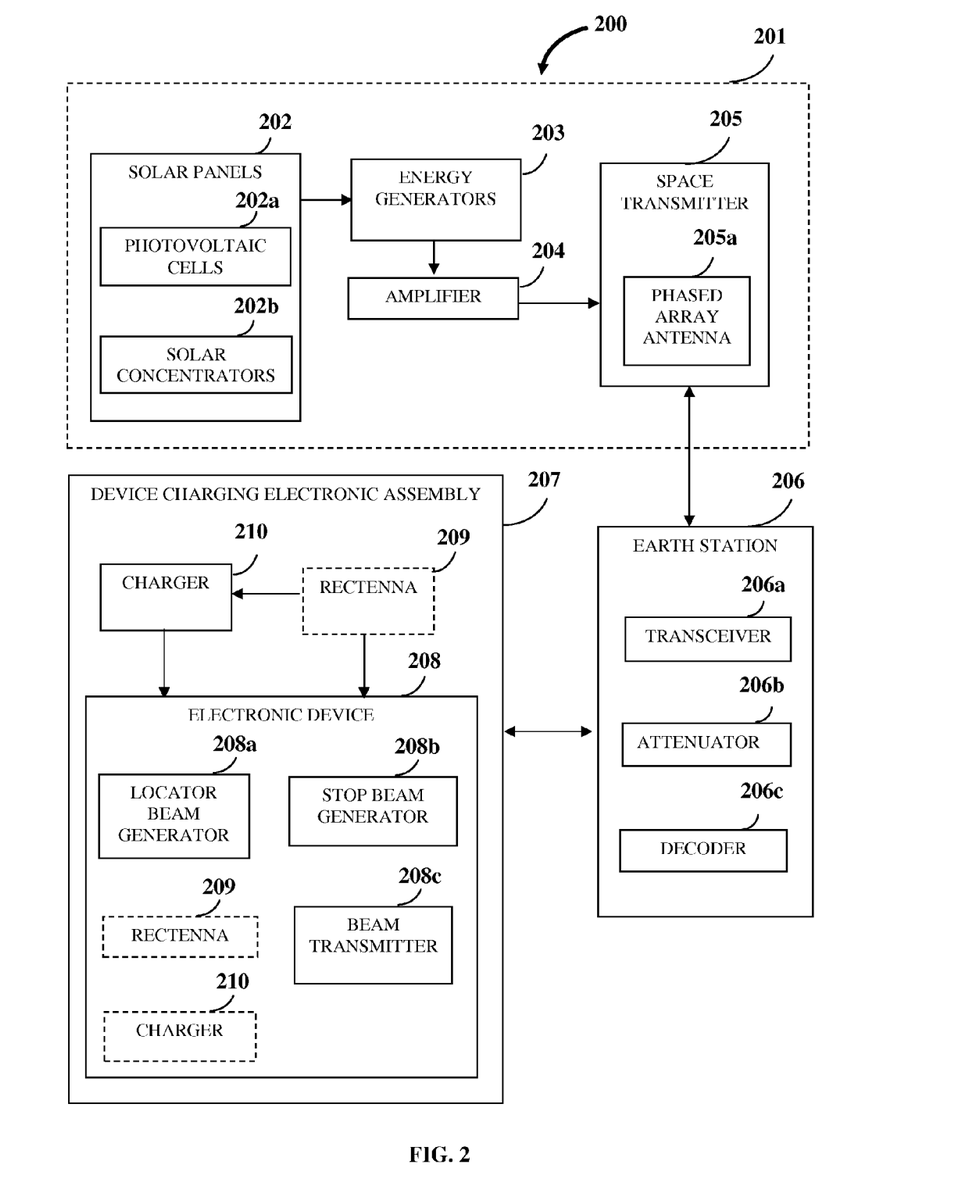
FIG. 2 exemplarily illustrates a system for solar powered charging of an electronic device.

FIG. 2 exemplarily illustrates a system 200 for solar powered charging of an electronic device 208. The system 200 disclosed herein comprises one or more solar panels 202, multiple energy generators 203, an amplifier 204, and a space transmitter 205 residing on an orbiting space station, or a satellite in a geostationary orbit 201. The photovoltaic cells 202a reside on the solar panels 202. The solar panels 202 are packaged, interconnected assemblies of multiple photovoltaic cells 202a. In an embodiment, multiple solar concentrators 202b, for example, flexible Fresnel lenses are provided on the photovoltaic cells 202a for concentrating the solar energy on the photovoltaic cells 202a. In an embodiment, a polished titanium sleeve (not shown) is provided on the solar panels 202 for reflective purposes. The photovoltaic cells 202a residing on the solar panels 202 convert solar energy incident on the photovoltaic cells 202a to direct current (DC) electrical power.

The energy generators 203 convert the DC electrical power produced by the photovoltaic cells 202a to generate energy waves, for example, microwaves, radio waves, laser beams, etc. The energy generators 203 are high-powered vacuum tubes that generate microwave energy using the interaction of a stream of electrons with a magnetic field, which is well known in the art. The energy generators 203 are, for example, klystrons, traveling-wave tubes, backward-wave oscillators and amplifiers, twystrons, and cross-field devices, which include resonant types such as magnetrons, non-resonant backward and forward wave types such as amplitrons, carcinatrons, dematrons, etc. The cross-field devices provide maximum efficiency in conversion of the DC electrical power to microwave energy, and the amplitrons are capable of handling large amounts of power. The magnetrons which are self-excited oscillators, and the amplitrons which are broadband amplifiers, utilize a similar principle of converting DC electrical power into microwave energy. The amplifier 204 amplifies the generated microwave energy to high power microwave energy in order to transmit the microwave energy over long distances. The amplifier 204, for example, is a solid state amplifier. The amplifier 204 directs the high power microwave energy to the space transmitter 205.

The space transmitter 205 relays the high power microwave energy to one or more earth stations 206 positioned at predetermined locations on the earth's surface. The space transmitter 205 comprises a phased array antenna 205a for forming a beam of high power microwave energy from the high power microwave energy directed to the space transmitter 205 from the amplifier 204. The phased array antenna 205a is a directive antenna composed of a number of radiating elements in which the relative phases of the respective signals feeding the radiating elements are varied in such a way that the effective radiation pattern of the array is reinforced in a desired direction and suppressed in undesired directions. Moreover, the phased array antenna 205a controls, directs, and transmits the beam of high power microwave energy to the earth stations 206.

The system 200 disclosed herein further comprises one or more earth stations 206 and a device charging electronic assembly 207. Each of the earth stations 206 comprises a transceiver 206a, an attenuator 206b, and a decoder 206c. The transceiver 206a transmits a pilot beam from the earth station 206 to the space transmitter 205 on reception of a locator beam from the electronic device 208. The pilot beam signals the space transmitter 205 to initiate the relaying of the microwave energy from the space transmitter 205 to the earth station 206. The transceiver 206a of the earth station 206 receives and transmits the relayed microwave energy from the space transmitter 205 to the device charging electronic assembly 207. The transceiver 206a comprises adaptive phased arrays for controlling the direction of microwave energy to be received and transmitted to and from the transceiver 206a. The adaptive phased arrays in the transceiver 206a align themselves in the direction determined by the decoder 206c for transmission of the low power microwave energy to the electronic device 208. The adaptive phased arrays in the transceiver 206a operate, for example, in the range of about 2 GHz to about 10 GHz, as the current rectenna technology returns maximum efficiencies in the microwave frequency range of, for example, about 2 GHz to about 10 GHz. The decoder 206c determines the location of the electronic device 208 from the locator beam received from the electronic device 208.

The attenuator 206b attenuates high power microwave energy having a power density of, for example, about 1 kW/cm$^2$ received from the space transmitter 205 down to low power microwave energy having a power density of, for example, about 10 mW/cm$^2$ for transmission to the electronic device 208 of the device charging electronic assembly 207. The attenuator 206b is an electronic device 208 that reduces the power of a signal without distorting the signal's waveform. The attenuator 206b in each of the earth stations 206 attenuates the received beam of high power microwave energy down to a low power microwave energy that is safe for transmission on earth.

The device charging electronic assembly 207 is in communication with one or more earth stations 206. The device charging electronic assembly 207 comprises the electronic device 208 and a charger 210. The electronic device 208 comprises a locator beam generator 208a and a stop beam generator 208b. The locator beam generator 208a generates a locator beam, for example, an RF signal, a microwave signal, etc., that indicates the current location of the electronic device 208 with respect to the earth station 206. The stop beam generator 208b generates a stop beam, for example, an RF signal, a microwave signal, etc., transmitted to the earth station 206 to indicate that the electronic device 208 no longer requires the low power microwave energy. The electronic device 208 further comprises a beam transmitter 208c for transmitting the locator beam and the stop beam from the electronic device 208 to the earth station 206. The electronic device 208 transmits the stop beam to the earth station 206, for example, on completion of charging of the electronic device 208.

In an embodiment, the beam transmitter 208c provides location updates to the earth station 206 based on change in location of the electronic device 208, when the electronic device 208 is in motion. The beam transmitter 208c provides the location updates by transmitting locator beams to the earth station 206 for indicating the current location of the electronic device 208.

The charger 210, in electric communication with the electronic device 208, receives the low power microwave energy from the earth station 206 and charges the electronic device 208 with the low power microwave energy. In an embodiment, the device charging electronic assembly 207 further comprises a rectenna 209 in electronic communication with the electronic device 208. The rectenna 209 receives the low power microwave energy transmitted to the rectenna 209 by the transceiver 206a on the earth station 206 and converts the low power microwave energy to DC electrical power. The charger 210, in electric communication with the rectenna 209 and the electronic device 208, receives the DC electrical power from the rectenna 209 and charges the electronic device 208 with the DC electrical power. The charger 210 refers to a battery charger that feeds energy to a battery of the electronic device 208.

In an embodiment, the rectenna 209 and/or the charger 210 reside within the electronic device 208. In another embodiment, the rectenna 209 and/or the charger 210 resides external to the electronic device 208. The charger 210 uses the DC electrical power generated by the rectenna 209 to charge the battery of the electronic device 208 and/or uses the DC electrical power as a source of operating power for the electronic device 208. In an embodiment, the electronic device 208 is configured to directly receive the low power microwave energy from the earth station 206 for charging the electronic device 208. In another embodiment, the electronic device 208 is configured to directly receive the DC electrical power from the rectenna 209.

Figure 3:
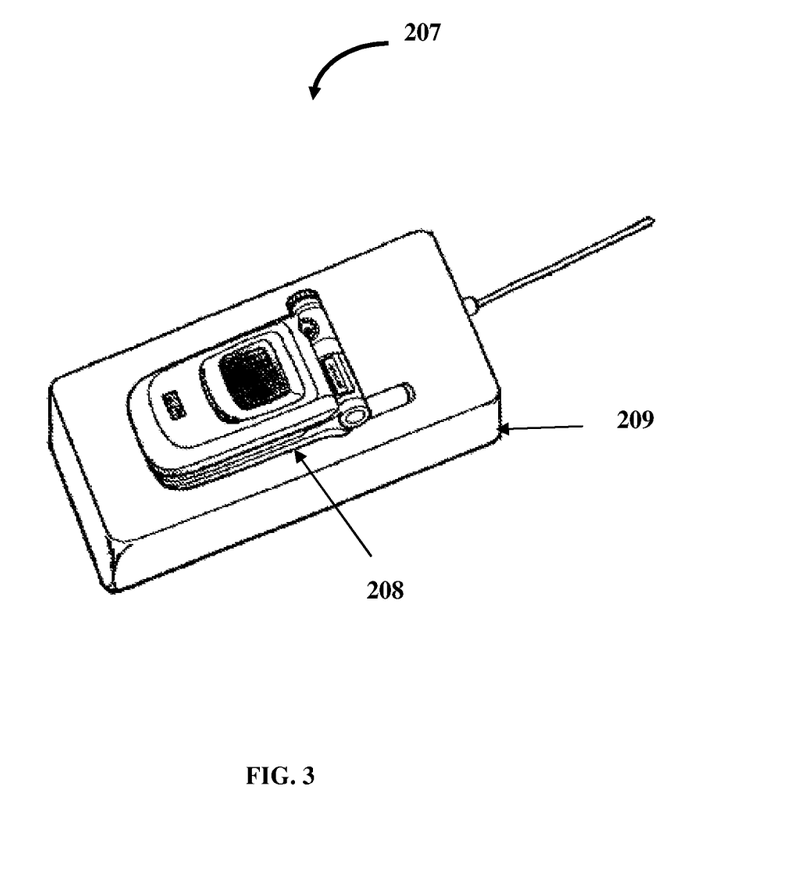
FIG. 3 exemplarily illustrates an embodiment of the system for solar powered charging of an electronic device, where a rectenna resides external to the electronic device.

FIG. 3 exemplarily illustrates an embodiment of the system 200 for solar powered charging of an electronic device 208, where the rectenna 209 resides external to the electronic device 208, for example, a mobile phone. The rectenna 209 is placed in electronic communication with the electronic device 208 during reception of low power microwave energy from the earth station 206. The rectenna 209, for example, defines a chamber into which the electronic device 208 is placed during reception of the low power microwave energy from the earth station 206. The rectenna 209 is also in electronic communication with the charger 210, which in turn is in electric communication with the electronic device 208. The rectenna 209 receives the low power microwave energy transmitted by the earth station 206 and converts the low power microwave energy to DC electrical power. The DC electrical power is then directed to the charger 210. The charger 210 charges a battery of the electronic device 208 using the DC electrical power from the rectenna 209.

FIG. 4 exemplarily illustrates an embodiment of the system 200 for solar powered charging of an electronic device 208, where the electronic device 208 selects one of the earth stations 206 for receiving energy waves, for example, microwave energy for charging the electronic device 208. The space transmitter 205 relays the high power or low power microwave energy to the earth stations 206. One or more earth stations 206 are positioned at predetermined geographical locations on the earth's surface, such that the earth stations 206 cover an area sufficient to charge subscriber electronic devices. Each of the earth stations 206 continuously transmits a beacon signal. The beacon signal is, for example, a radio frequency (RF) signal, a microwave signal, etc. In an example, each of the earth stations 206 transmits a beacon signal of about 10 kW power. The strength of the beacon signal decreases with the distance traveled by the beacon signal. When an electronic device 208 in the device charging electronic assembly 207 of the system 200 disclosed herein is within the communication range of two or more earth stations 206, the electronic device 208 receives beacon signals from two or more earth stations 206. The electronic device 208 selects one of the earth stations 206 based on the strength of the beacon signal. For example, the electronic device 208 selects the earth station 206 that transmits a beacon signal with the highest signal strength. On selecting the earth station 206, the electronic device 208 transmits a locator beam to the selected earth station 206. The selected earth station 206 determines the location of the electronic device 208 from the locator beam, and transmits a pilot beam to the space transmitter 205 for initiating relaying of the microwave energy to the selected earth station 206. The selected earth station 206 then transmits the relayed microwave energy directly to the charger 210 for charging the electronic device 208, or to the rectenna 209 which converts the relayed microwave energy to DC electrical power used for charging the electronic device 208 by the charger 210.

FIG. 5 illustrates an embodiment of the system 200 for solar powered charging of an electronic device 208, where a space transmitter 205 transmits low power energy waves, for example, microwave energy to the earth station 206 for charging the electronic device 208. In this embodiment, the system 200 disclosed herein comprises one or more solar panels 202, multiple energy generators 203, and a space transmitter 205 residing on an orbiting space station, or a satellite in a geostationary orbit 201. The photovoltaic cells 202a reside on the solar panels 202. In an embodiment, multiple solar concentrators 202b, for example, flexible Fresnel lenses are provided on the photovoltaic cells 202a for concentrating the solar energy on the photovoltaic cells 202a. The photovoltaic cells 202a residing on the solar panels 202 convert solar energy directed on the photovoltaic cells 202a to DC electrical power.

The energy generators 203 convert the DC electrical power produced by the photovoltaic cells 202a to generate low power microwave energy having a power of, for example, about 1 kW. The space transmitter 205 relays the low power microwave energy to the earth station 206. The space transmitter 205 comprises a phased array antenna 205a for forming a beam of low power microwave energy. The phased array antenna 205a controls and directs the beam of low power microwave energy and relays the beam of low power microwave energy to the earth station 206.

The system 200 disclosed herein further comprises earth stations 206 and a device charging electronic assembly 207. Each of the earth stations 206 comprises a transceiver 206a and a decoder 206c. The transceiver 206a transmits a pilot beam from the earth station 206 to the space transmitter 205 on reception of a locator beam from the electronic device 208. The pilot beam signals the space transmitter 205 to initiate the relaying of the low power microwave energy having a power of, for example, about 0.1 mW, from the space transmitter 205 to the earth station 206. The transceiver 206a of the earth station 206 receives and transmits the relayed low power microwave energy to the electronic device 208. The adaptive phased arrays in the transceiver 206a align themselves in the direction determined by the decoder 206c for transmission of the low power microwave energy to the electronic device 208. The adaptive phased arrays in the transceiver 206a operate, for example, in the range of about 2 GHz to about 10 GHz. The decoder 206c determines the location of the electronic device 208 from the locator beam transmitted by the electronic device 208.

The device charging electronic assembly 207 comprises the electronic device 208 and the charger 210. The electronic device 208 comprises a locator beam generator 208a and a stop beam generator 208b. The locator beam generator 208a generates a locator beam that indicates the current location of the electronic device 208 with respect to the earth station 206. The stop beam generator 208b generates a stop beam that indicates that the electronic device 208 no longer requires the reception of the low power microwave energy. The electronic device 208 further comprises a beam transmitter 208c for transmitting the locator beam and the stop beam to the earth station 206. The electronic device 208 transmits the stop beam to the earth station 206, for example, on completion of charging of the electronic device 208.

The charger 210, in electric communication with the electronic device 208, receives the low power microwave energy transmitted by the earth station 206 and charges the electronic device 208 with the low power microwave energy. In an embodiment, the electronic device 208 is provided with an in-built or external rectenna 209 that receives the low power microwave energy transmitted from the earth station 206 and converts the low power microwave energy to DC electrical power. The charger 210 in electric communication with the rectenna 209 and the electronic device 208 charges the electronic device 208 with the DC electrical power directed to the charger 210 from the rectenna 209.

Figure 6:
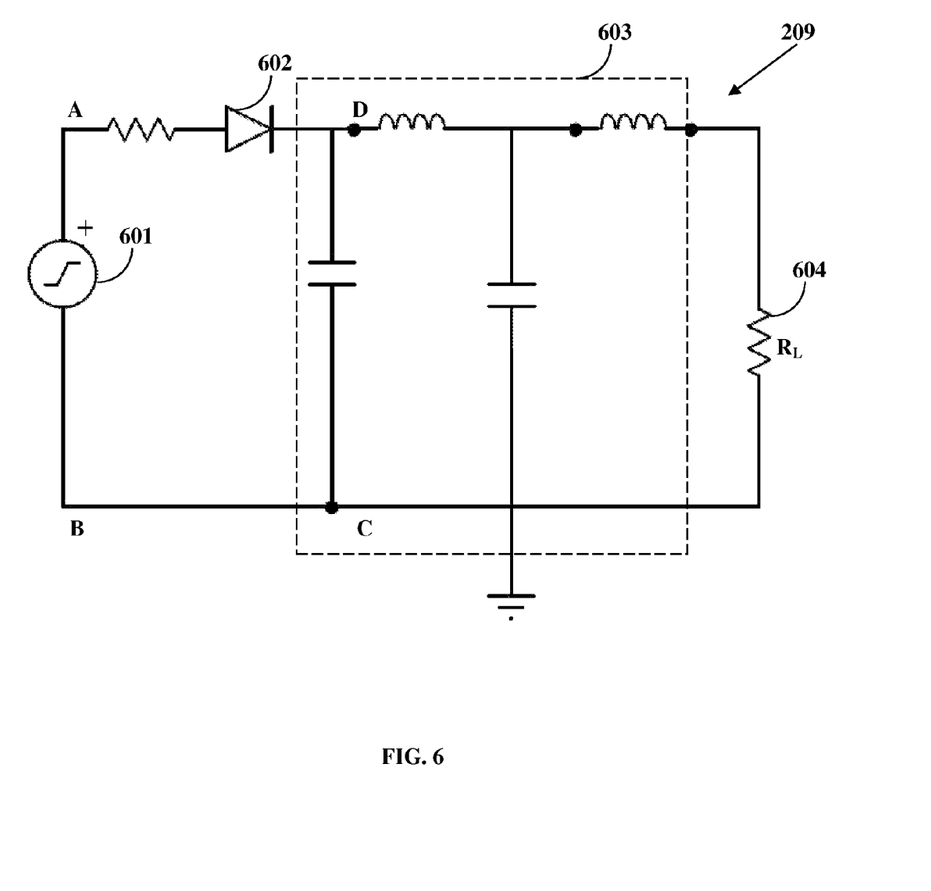
FIG. 6 exemplarily illustrates a schematic diagram of a rectenna.

FIG. 6 exemplarily illustrates a schematic diagram of a rectenna 209. A typical rectenna 209 comprises an antenna 601, a diode rectifier 602, and a direct current (DC) bypass filter 603. The rectenna 209 is a "rectifying antenna". The rectenna 209 receives energy waves, for example, microwaves from the earth station 206 and converts the received microwaves to a usable low frequency or DC electrical power. The diode rectifier 602 converts incoming high frequency electromagnetic or energy waves into DC electrical power. While FIG. 6 illustrates a half wave diode rectifier 602 circuit, full wave rectifiers utilizing two or four diodes may also be utilized for converting high frequency electromagnetic waves into DC electrical power. The resistor RL 604 indicates a load, for example, a DC voltmeter, to which the antenna 601 is connected. The DC bypass filter 603 is, for example, a low pass filter that blocks high frequency components, for example, alternating current (AC) components and allows low frequency and/or DC components to pass through since DC components exhibit low or zero frequency variation with respect to time. The output of the DC bypass filter 603 is connected to the resistor RL 604.

The rectifier 602 utilizes the antenna 601, for example, a circular horn antenna, a pyramidal horn antenna, a sectional horn antenna, a parabolic reflector antenna, a lens antenna, or a patch antenna to capture microwave energy. The antenna 601 comprises a pair of electromagnetic wave absorbing elements that are mutually insulated, substantially identical, pyramidal or conical, aligned and relatively closely packed, and metallic made of copper or other suitable material, etc. Voltage variations derived at nodes A and B in response to the electric field variations of the electromagnetic wave energy impinging on the electromagnetic wave absorbing elements are converted into an electric voltage at nodes C and D. The voltages at nodes C and D are replicas of the electric field variations impinging on the electromagnetic wave absorbing elements of the antenna 601.

The energy waves used for relaying energy from the space transmitter 205 to the earth stations 206 are not limited to microwaves; the method and system 200 disclosed herein may utilize other electromagnetic waves from the radio frequency spectrum through the visible light spectrum.

Figure 7A:
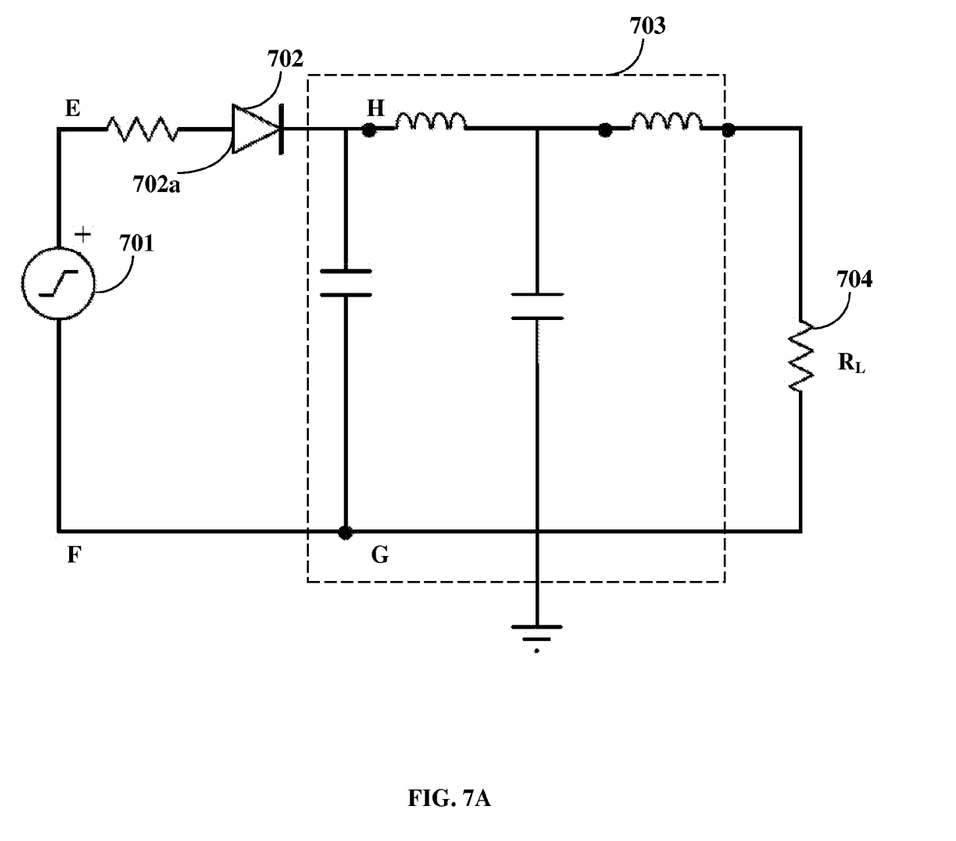
FIGS. 7A-7B exemplarily illustrate an embodiment of the system for solar powered charging of an electronic device, where a space transmitter transmits radio waves to the earth station.
Figure 7B:
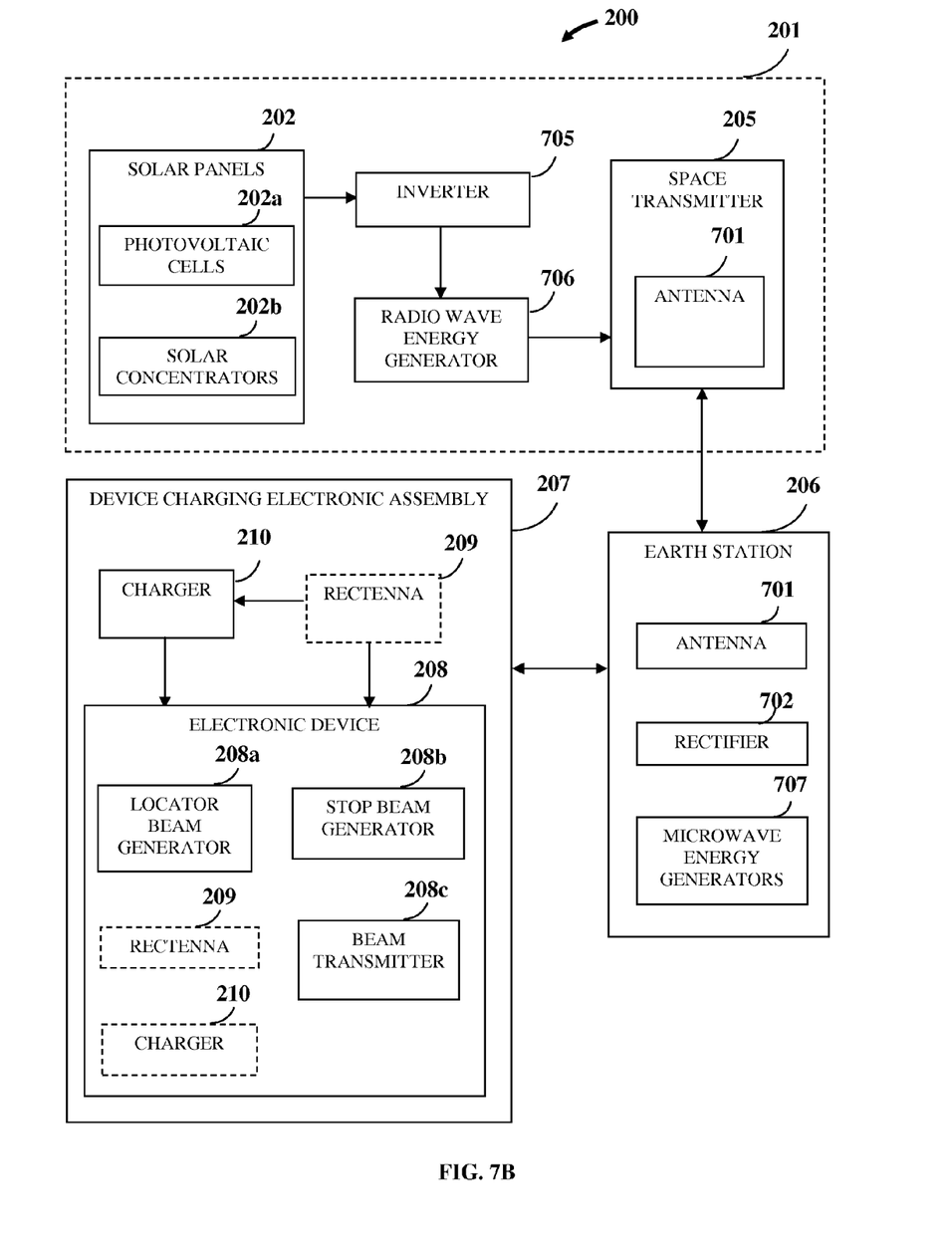

FIGS. 7A-7B exemplarily illustrate an embodiment of the system 200 for solar powered charging of an electronic device 208, where a space transmitter 205 transmits radio waves to the earth station 206. A rectifier 702 provided in the earth station 206 utilizes different antennas 701 for capturing electromagnetic waves of different wavelengths. The rectifier 702 may also utilize a configurable antenna 701 structure to capture electromagnetic wave energy from the infrared region to the visible light spectrum. The configurable antenna 701 structure comprises a pair of electromagnetic wave absorbing elements that are mutually insulated, substantially identical, pyramidal or conical, aligned and relatively closely packed, and metallic made of copper or other suitable material, etc. Shape, cross section and height of the electromagnetic wave absorbing elements and distance between the electromagnetic wave absorbing elements are configurable to capture electromagnetic waves from the infrared region through the visible light spectrum. One of the electromagnetic wave absorbing elements is connected to an anode of the diode 702a of the rectifier 702 and the other electromagnetic wave absorbing element is connected to node G. Voltage variations derived at nodes E and F in response to the electric field variations of the electromagnetic wave energy impinging on the electromagnetic wave absorbing elements are converted into an electric voltage at nodes G and H. The voltages at nodes G and H are replicas of the electric field variations impinging on the electromagnetic wave absorbing elements of the configurable antenna 701 structure.

In an embodiment, the method and system 200 disclosed herein captures energy from electromagnetic waves in the radio frequency spectrum. To capture energy from a radio wave in the radio frequency spectrum having frequency less than 1 megahertz (MHz), the rectifier 702 may utilize a monopole antenna 701. The monopole antenna 701 is connected to node E and the energy of the radio wave is converted to DC electrical power by the half wave rectifier 702.

To capture energy from the radio wave in the radio frequency spectrum having frequency greater than 2 MHz, the method and system 200 disclosed herein utilizes a dipole antenna 701 in combination with a full wave rectifier 702. The full wave rectifier 702 may replace the half wave rectifier 702 to convert the entire radio frequency wave into a constant polarity at its output. The constant output is provided to the low pass filter 703, which removes AC components in the output of the full wave rectifier 702. The resistor RL 704 indicates a load, for example a DC voltmeter, to which the antenna 701 is connected.

In the embodiment of the system 200 exemplarily illustrated in FIG. 7B, the system 200 disclosed herein comprises one or more solar panels 202, an inverter 705, a radio wave energy generator 706, and a space transmitter 205 residing on an orbiting space station, or a satellite in a geostationary orbit 201. Consider an example where the direct current (DC) electrical power produced by the photovoltaic cells 202a in the space station, or the satellite in the geostationary orbit 201 is amplified to obtain a total power of 100 MW. The inverter 705 converts the amplified DC electrical power to an alternating current (AC) electrical power. The inverter 705 is an electrical device that converts direct current (DC) to alternating current (AC). The alternating current (AC) can be obtained at any required voltage and frequency with the use of appropriate transformers, switching elements such as reverse conducting thyristors, and control circuits. The alternating current is provided to the radio wave energy generator 706, for example, an oscillator circuit. The radio wave energy generator 706 generates high frequency radio waves, for example, of the order of about 10 kilohertz (kHz) to 100 MHz. The high frequency radio waves are provided to a dipole antenna 701 in the space transmitter 205 for transmission of the radio waves to the earth station 206. The gain of the dipole antenna 701 is 2.15 dBi (decibels (isotropic)), assuming linear polarization of the electromagnetic field. dBi is the forward gain of the antenna 701 compared with the hypothetical isotropic antenna, which uniformly distributes energy in all directions.

Power density of the radio waves can be calculated using the following equation:

$$S=P*G/4*\pi*R*R,$$

where S is power density in mW/cm$^2$; G is gain of the antenna 701; P is power input to antenna 701 in mW; and R is distance to the centre of radiation of the antenna 701 in centimeters (cm). In this case, R is the distance of the satellite from the earth and the value of R is 357 cm×107 cm. Substituting the values of P=100MW, G=2.15 dBi and R=357×107 cm results in a power density of 1.02×10 mW/cm$^2$. This is the power density of the radio waves received by the earth station 206. The earth station 206 comprises one or more dipole antennas 701 to capture the high frequency radio waves. The rectifier 702 converts the captured radio frequency waves to DC electrical power. The DC electrical power is provided to one or more microwave energy generators 707 in the earth station 206. The microwave energy generators 707 convert the DC electrical power to low power microwave energy. The low power microwave energy is transmitted directly to the charger 210 or to the rectenna 209 of the device charging electronic assembly 207. The rectenna 209, in electronic communication with the electronic device 208, receives the low power microwave energy transmitted by the earth station 206 and converts the low power microwave energy to DC electrical power. The charger 210 in electric communication with the rectenna 209 and the electronic device 208 charges the electronic device 208 with the DC electrical power directed to the charger 210 from the rectenna 209. In an embodiment, the charger 210 directly charges the electronic device 208 using the low power microwave energy.

Consider an example for solar powered charging of an electronic device 208, for example, a mobile phone 208. The electronic device 208 is herein referred to as a "mobile phone". A user triggers the beam transmitter 208c of the mobile phone 208 to transmit a locator beam to the earth station 206. The locator beam indicates to the earth station 206 that the mobile phone 208 requires charging and also indicates the current location of the mobile phone 208. In an embodiment, the location of the earth station 206 is fixed and encoded in the beam transmitter 208c of the mobile phone 208, to enable the mobile phone 208 to transmit the locator beam in the direction of the earth station 206. The transceiver 206a in the earth station 206 receives the locator beam. The earth station 206 on reception of the locator beam transmits a pilot beam to the space transmitter 205 residing on the orbiting space station, or the satellite in the geostationary orbit 201 to signal the space transmitter 205 to initiate relaying of microwave energy to the earth station 206. The decoder 206c in the earth station 206 decodes the locator beam to determine the location of the mobile phone 208. The space transmitter 205 receives the pilot beam. On reception of the pilot beam, the space transmitter 205 transmits a beam of high power microwave energy generated by the energy generators 203 and amplified by the amplifier 204 to the earth station 206. The transceiver 206a in the earth station 206 receives the beam of high energy microwave energy transmitted by the space transmitter 205. The attenuator 206b in the earth station 206 attenuates the high power microwave energy to low power microwave energy suitable for transmission on earth. The transceiver 206a transmits the low power microwave energy in the direction of the location of the electronic device 208 determined by the decoder 206c.

In an embodiment, the user connects the rectenna 209 to the mobile phone 208. The rectenna 209, for example, is disposed outside of the mobile phone 208 as exemplarily illustrated in FIG. 3. The rectenna 209 defines, for example, a chamber in which the mobile phone 208 is placed during reception of the microwave energy. The rectenna 209 receives the transmitted low power microwave energy. The rectenna 209 then converts the received low power microwave energy to DC electrical power. The connection between the mobile phone 208 and the charger 210 is such that the rectenna 209 is in electric communication with the charger 210 of the mobile phone 208. The charger 210 receives the DC electrical power from the rectenna 209 and charges the battery of the mobile phone 208. The DC electrical power may also be used as a power source for operating the mobile phone 208. The charger 210 may also directly charge the mobile phone 208 using the low power microwave energy received from the earth station 206.

When the mobile phone 208 is moved to a new location outside the reception area of the mobile phone 208, the beam transmitter 208c of the mobile phone 208 transmits another locator beam to the earth station 206, identifying the new location of the mobile phone 208. The decoder 206c determines the new location of the mobile phone 208 and the adaptive phased arrays of the transceiver 206a are aligned to transmit the low power microwave energy in the new direction of the mobile phone 208.

When the mobile phone 208 is moved to a new location, the mobile phone receives beacon signals from two or more earth stations 206 that are within the reception area of the mobile phone 208. The signal strength of the beacon signals from the earth station 206 differs based on the distance of the earth station 206 from the mobile phone 208. The farther an earth station 206 is from the mobile phone 208 the weaker is the strength of the signal. The mobile phone 208 selects the earth station 206 whose beacon signal is strongest from the received beacon signals. The mobile phone 208 then transmits a locator beam to the selected earth station 206, indicating the current location of the mobile phone 208.

When the charging of the mobile phone 208 is complete, the user triggers the beam transmitter 208c of the mobile phone 208 to transmit a stop beam from the mobile phone 208, for example, by pressing a button on the mobile phone 208. On reception of the stop beam, the transceiver 206a in the earth station 206 terminates transmission of the low power microwave energy to the mobile phone 208.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method for solar powered charging of an electronic device, comprising:

providing a plurality of photovoltaic cells on one of an orbiting space station and a satellite in a geostationary orbit;

converting solar energy incident on said photovoltaic cells to direct current electrical power, wherein said direct current electrical power is directed to a plurality of energy generators residing on one of said orbiting space station and said satellite in said geostationary orbit;

converting said direct current electrical power to generate energy waves by said energy generators, wherein said energy waves are directed to a space transmitter residing on one of said orbiting space station and said satellite in said geostationary orbit;

relaying said energy waves by said space transmitter to one or more earth stations positioned at predetermined locations on an earth surface;

continuously transmitting a beacon signal by each of said one or more earth stations to said electronic device to establish a communication range between said electronic device and each of said one or more earth stations;

selecting one of said one or more earth stations by said electronic device when said electronic device is within said communication range of said one or more earth stations for receipt of said relayed energy waves from said earth stations;

determining a location of said electronic device with respect to said one or more earth stations, comprising:

transmitting a locator beam to one of said one or more earth stations by said electronic device for indicating said location of said electronic device;

receiving said locator beam by said one of said one or more earth stations; and determining said location of said electronic device from said locator beam by said one of said one or more earth stations;

transmitting a pilot beam by said one of said one or more earth stations to said space transmitter based on said reception of said locator beam from said electronic device, wherein said pilot beam signals said space transmitter to initiate said relaying of said energy waves from said space transmitter to said one of said one or more earth stations, wherein said electronic device selects one of said one or more earth stations based on strength of said beacon signal of each of said one or more earth stations;

transmitting said relayed energy waves by one of said one or more earth stations to said electronic device;

receiving said relayed energy waves by a charger in electric communication with said electronic device; and charging said electronic device with said relayed energy waves by said charger.

2. The method of claim 1, wherein said relayed energy waves comprise one of microwaves, laser beams, and radio waves.

3. The method of claim 1, further comprising providing a rectenna in electronic communication with said electronic device, wherein said one of said one or more earth stations transmits said relayed energy waves to said rectenna.

4. The method of claim 3, wherein said rectenna receives said relayed energy waves from said one of said one or more earth stations, converts said relayed energy waves to local direct current electrical power, and directs said local direct current electrical power to said charger for charging said electronic device with said local direct current electrical power.

5. The method of claim 1, further comprising providing a plurality of solar concentrators on said photovoltaic cells for concentrating said solar energy on said photovoltaic cells, wherein said solar concentrators are a plurality of flexible Fresnel lenses.

6. The method of claim 1, further comprising providing location updates to said one of said one or more earth stations based on a change in location of said electronic device, wherein said electronic device provides said location updates by transmitting locator beams to said one of said one or more earth stations for indicating a current location of said moving electronic device.

7. The method of claim 1, further comprising amplifying said generated energy waves to high power energy waves by an amplifier residing on one of said orbiting space station and said satellite in said geostationary orbit.

8. The method of claim 7, wherein said space transmitter comprises a phased array antenna for forming and transmitting a beam of said high power energy waves to said one or more earth stations.

9. The method of claim 8, further comprising attenuating said high power energy waves by said one or more earth stations to low power energy waves for transmission to said electronic device.

10. The method of claim 1, wherein said generated energy waves are low power energy waves, wherein said space transmitter relays said low power energy waves to said one or more earth stations, wherein said one of said one or more earth stations transmits said low power energy waves to said charger for charging said electronic device.

11. A system for solar powered charging of an electronic device, comprising:

a plurality of photovoltaic cells on one of an orbiting space station and a satellite in a geostationary orbit, wherein said photovoltaic cells convert solar energy incident on said photovoltaic cells to direct current electrical power;

a plurality of energy generators residing on one of said orbiting space station and said satellite in said geostationary orbit, wherein said energy generators convert said direct current electrical power directed to said energy generators by said photovoltaic cells to generate energy waves;

a space transmitter residing on one of said orbiting space station and said satellite in said geostationary orbit, wherein said space transmitter relays said energy waves directed to said space transmitter by said energy generators to one or more earth stations positioned at predetermined locations on an earth surface;

a transceiver on each of said one or more earth stations, wherein said transceiver is configured to perform:

continuously transmitting a beacon signal to said electronic device to establish a communication range between said electronic device and each of said one or more earth stations;

receiving said relayed energy waves from said space transmitter and transmitting said relayed energy waves to a device charging electronic assembly;

receiving a locator beam;

determining a location of the electronic device from said locator beam;

transmitting a pilot beam to said space transmitter upon receiving said locator beam from said electronic device, wherein said pilot beam signals said space transmitter to initiate said relaying of said energy waves;

said device charging electronic assembly in communication with said one of said one or more earth stations, wherein said electronic device selects one of said one or more earth stations when said electronic device is within said communication range of said one or more earth stations for receipt of said relayed energy waves from said earth stations, wherein said electronic device selects one of said one or more earth stations based on strength of said beacon signal of each of said one or more earth stations, wherein said device charging electronic assembly comprises a charger in electric communication with said electronic device, wherein said charger receives said relayed energy waves transmitted to said device charging electronic assembly by said one of said one or more earth stations and charges said electronic device with said received energy waves.

12. The system of claim 11, wherein said energy generators generate one of microwaves, laser beams, and radio waves.

13. The system of claim 11, wherein said device charging electronic assembly further comprises a rectenna in electronic communication with said electronic device, wherein said rectenna receives said relayed energy waves transmitted to said rectenna by said transceiver on said one of said one or more earth stations, converts said relayed energy waves to local direct current electrical power, and directs said local direct current electrical power to said charger, and wherein said charger receives said local direct current electrical power from said rectenna and charges said electronic device with said local direct current electrical power.

14. The system of claim 11, further comprising a plurality of solar concentrators on said photovoltaic cells that concentrates said solar energy on said photovoltaic cells, wherein said solar concentrators are a plurality of flexible Fresnel lenses.

15. The system of claim 11, further comprising an amplifier residing on one of said orbiting space station and said satellite in said geostationary orbit, wherein said amplifier amplifies said generated energy waves to high power energy waves.

16. The system of claim 15, wherein said space transmitter comprises a phased array antenna that forms a beam of high power energy waves from said high power energy waves directed to said space transmitter from said amplifier, controls and transmits said beam of high power energy waves to said transceiver on each of said one or more earth stations.

17. The system of claim 11, further comprising a beam transmitter in said electronic device that performs:
   transmitting said locator beam to said one of said one or more earth stations, wherein said locator beam indicates location of said electronic device; and
   transmitting a stop beam to said one of said one or more earth stations, wherein said stop beam indicates termination of said transmission of said relayed energy waves from said one of said one or more earth stations to said electronic device.

18. The system of claim 17, wherein said beam transmitter provides location updates to said one of said one or more earth stations based on a change in location of said electronic device, when said electronic device is in motion, wherein said beam transmitter provides said location updates by transmitting locator beams to said one of said one or more earth stations for indicating a current location of said electronic device.

19. The system of claim 11, further comprising a decoder in each of said one or more earth stations, wherein said decoder determines location of said electronic device from the locator beam received from said electronic device.

20. The system of claim 11, further comprising an attenuator in each of said one or more earth stations, wherein said attenuator attenuates high power energy waves received from said space transmitter to low power energy waves for transmission to said electronic device.

21. The system of claim 11, wherein said energy generators generate low power energy waves, wherein said space transmitter relays said low power energy waves to said one or more earth stations, wherein said one of said one or more earth stations transmits said low power energy waves to said charger for charging said electronic device with said low power energy waves.

* * * * *